UNITED STATES PATENT OFFICE.

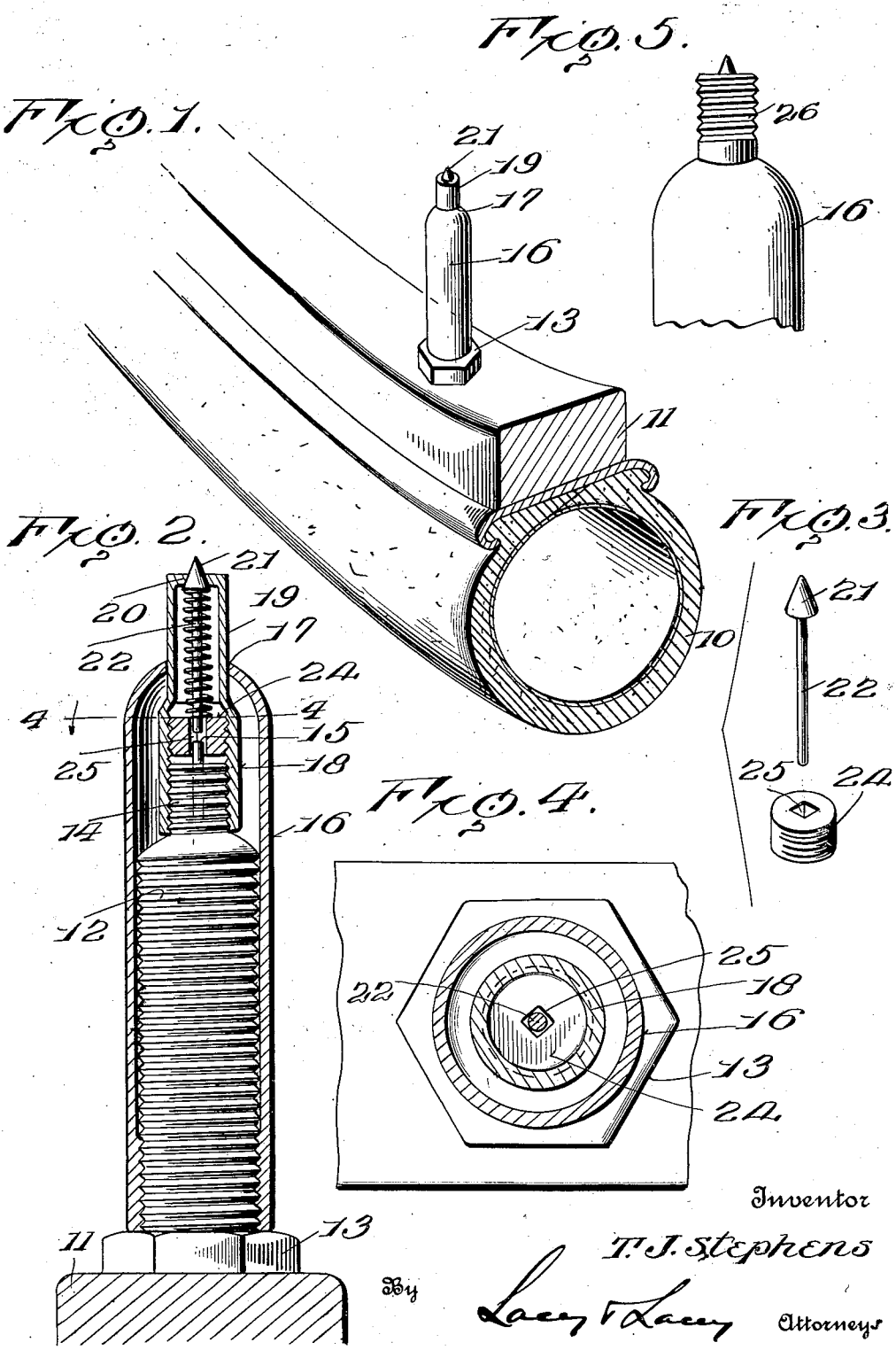

THOMAS JEFFERSON STEPHENS, OF SPOKANE, WASHINGTON.

AUXILIARY TIRE-VALVE.

1,304,116.  Specification of Letters Patent.  Patented May 20, 1919.

Application filed September 14, 1918. Serial No. 254,034.

*To all whom it may concern:*

Be it known that I, THOMAS JEFFERSON STEPHENS, citizen of the United States, residing at Spokane, in the county of Spokane and State of Washington, have invented certain new and useful Improvements in Auxiliary Tire-Valves, of which the following is a specification.

This invention relates to an improved auxiliary valve for motor vehicle tires and has as its primary object to provide a construction wherein the air pressure in the tires of a vehicle may be readily ascertained without the necessity for removing the dust caps commonly employed to cover the projecting ends of the usual tire valve casings.

The invention has as a further object to provide an auxiliary tire valve which may be connected directly to the outer end of the usual tire valve casing to project through the dust cap fitting over the casing so that a pressure gage may be applied over the auxiliary valve for ascertaining the air pressure of the tire without the necessity for removing the dust cap.

A still further object of the invention is to provide an auxiliary tire valve which will be formed to receive the usual hose connection from a source of air supply so that the tire may be inflated directly through the valve.

And the invention has a still further object to provide an auxiliary valve which, when applied to the usual tire valve casing, will form an added safeguard against possible leakage of air from the tire.

Other and incidental objects will appear during the course of the detailed description of the invention. In the drawings, wherein I have illustrated the preferred embodiment of the invention, and wherein similar reference characters designate corresponding parts throughout the several views:

Figure 1 is a fragmentary perspective view showing my improved valve applied to the valve casing of a conventional type of tire valve which is illustrated in connection with an ordinary wheel felly and pneumatic tire, Fig. 2 is a vertical sectional view more particularly illustrating the details of construction of the device, Fig. 3 is a perspective view showing the valve and its guide in detail, Fig. 4 is a transverse sectional view taken on the line 4—4 of Fig. 2, and Fig. 5 is a fragmentary perspective view showing a slight modification of the invention.

Referring now more particularly to the drawings, I have shown my improved auxiliary valve in connection with a conventional type of pneumatic tire valve. For convenience, a portion of a pneumatic tire has been conventionally illustrated at 10, and is shown in connection with a portion of a wheel felly 11. Projecting from the tire through the felly in the usual manner is the valve casing 12 of the tire upon which is threaded a nut 13 abutting the inner face of the felly. At its outer end the casing is formed with a reduced nipple 14 which is threaded to receive the ordinary hose connection of an air supply for inflating the tire and usually carries a closure cap. Housed within the casing is the usual valve mechanism including a stem 15 projecting a slight distance from the outer end of the casing and depressible for opening the valve carried by the inner end of the stem. Since this valve mechanism is well known, the valve thereof has not been shown. Threaded over the valve casing to abut the nut 13 is a dust cap 16 and in order that the valve of the present invention may be applied to the casing, this cap is formed at its outer end with a cylindrical axial opening 17.

Coming now more particularly to the subject of the present invention, I employ a cylindrical valve casing 18 which, at its inner extremity, is internally threaded to detachably engage over the nipple 14 of the valve casing 12. The outer end portion of the casing 18 is contracted to project freely through the opening 17 of the dust cap 16 and is reduced to provide a smooth nipple 19 of a diameter corresponding to that of the nipple 14 of the casing 12, the nipple 14 being adapted to receive the usual hose connection of an air supply. Closing the casing at its outer end is an end wall 20 in which is axially formed a tapered valve seat and coöperating with this seat is a conical valve 21 projecting at its smaller end a slight distance through said end wall. The valve 21 is formed with a stem 22 extending axially within the casing 18 and threaded within the larger open end of the casing is a guide 24 for the stem. This guide is provided axially with a squared opening 25 slidably receiving the free terminal of the stem so that the guide will, therefore, direct the valve in its movement toward or away from its seat. At its larger end the valve overhangs the valve stem and interposed between the said valve and the guide 24 is a helical spring 26 surrounding the valve stem and acting to normally hold the vale projected through the end wall 20 of the casing in closed position engaging with its seat. As will be seen, a wrench or other suitable tool may be engaged in the squared opening 25 of the guide for adjusting the guide within the valve casing to regulate the tension of the valve spring. However, it will be noted that the guide is preferably so positioned that when the valve 21 is closed, the outer terminal of the valve stem will project only part way through the opening 25 in the guide. Consequently, when applying the valve casing 18 to the nipple 14, said casing may be adjusted downwardly upon the nipple until the outer end of the valve stem 15 of the tire valve is received within said opening in close spaced relation to the outer end of the valve stem 22. Therefore, the guide 24 will also act to direct the outer end of the valve stem 15 when the tire valve is opened or closed and will hold the outer terminal of this stem in register with the outer terminal of the valve stem 22.

As will now be readily understood, it is only necessary, in order to apply my improved auxiliary valve, to first remove the usual cap ordinarily carried by the nipple 14 of the tire valve casing 12 and thread the casing 18 of the auxiliary valve directly onto the said nipple. The cap 16 is then applied, as shown in Figs. 1 and 2, when the device is ready for use. Thus, it will be seen that an ordinary pressure gage may be applied to the nipple 19 of the auxiliary valve for depressing the valve 21 and consequently shifting the valve stem 22 to engage the valve stem 15 and correspondingly depress the tire valve within the casing 12 when the air within the tire 10 will be permitted to flow up through the casings 12 and 18 and into the gage for registering a reading of the air pressure within the tire. As will be clear, this operation may be readily accomplished without the necessity of removing the dust cap 16 so that in any instance where the tires of a vehicle are equipped with my improved auxiliary valve, a reading of the air pressure within each of the tires may be easily and quickly obtained without the necessity for the removal of any of the dust caps of the tire valve casings of the tires. Furthermore, as will be understood in view of the preceding description, the tires of the vehicle may be inflated with a minimum of difficulty by applying the hose connection of any suitable source of air supply directly to the nipple 19 of each of the auxiliary valves and since these valves are spring pressed and are normally held in closed position, it will be seen that said valves will also provide an added safeguard against possible leakage of air from the tires of the vehicle.

In Fig. 5 of the drawings, I have illustrated a slight modification of the invention wherein the casing of the improved valve is formed at its upper end with a reduced nipple 26 corresponding to the nipple 19 of the preferred construction but instead of being smooth as in the preferred embodiment of the invention, the nipple 26 is externally screw threaded for receiving the hose connection of a suitable source of air supply. Otherwise, the modification is identical with the preferred construction. Further description is accordingly unnecessary.

Having thus described the invention, what is claimed as new is:

1. An auxiliary valve for pneumatic tires including a casing open at its inner end and provided at its outer end with a valve seat, and a valve mounted to reciprocate within said casing and including a valve body normally engaging said seat projecting exteriorly of the casing, the casing being adapted for attachment at its inner end with the outer end of a tire valve casing whereby the valve body of the auxiliary valve may be depressed for opening the tire valve.

2. The combination with a tire valve casing, a valve arranged within the casing and having a stem depressible for opening the valve, and a dust cap fitting over the casing, of an auxiliary valve including a casing fitting over the outer end of the tire valve casing and projecting through the dust cap, a valve reciprocable within the auxiliary casing and provided with a stem movable to depress the stem of the tire valve, and means normally holding the auxiliary valve closed.

3. The combination with a tire valve casing, a valve arranged within the casing and having a stem depressible for opening the valve, and a dust cap fitting over the casing, of an auxiliary valve including a casing fitting over the outer end of the tire valve casing and projecting through the dust cap, a nipple formed from the outer extremity of the auxiliary casing and adapted to receive an air supply hose connection, a valve reciprocable within the auxiliary casing and provided with a stem movable to depress the stem of the tire valve, and means normally holding the auxiliary valve closed.

4. The combination with a tire valve casing, a valve arranged within the casing and having a stem depressible for opening the valve, and a dust cap fitting over the casing, of an auxiliary valve including a casing fitting over the outer end of the tire valve casing and projecting through the dust cap, a valve stem guide within the auxiliary casing, a valve reciprocable within the auxiliary casing and provided with a stem engaged within the guide and centered thereby for movement to depress the stem of the tire valve, and means normally holding the auxiliary valve closed.

5. The combination with a tire valve casing, a valve arranged within the casing and having a stem depressible for opening the valve, and a dust cap fitting over the casing, of an auxiliary valve including a casing fitting over the outer end of the tire valve casing and projecting through the dust cap, a valve stem guide within the auxiliary casing provided with an opening therethrough receiving the outer end of the tire valve stem, a valve reciprocable within the auxiliary casing and provided with a stem received at its outer end within the opening of the guide and held thereby for movement to depress the stem of the tire valve, and means normally holding the auxiliary valve closed.

6. The combination with a tire valve casing, a valve arranged within the casing and having a stem depressible for opening the valve, and a dust cap fitting over the casing, of an auxiliary valve including a casing fitting over the outer end of the tire valve casing and projecting through the dust cap, a valve stem guide within the auxiliary casing, an auxiliary valve within said auxiliary casing provided with a stem engaged with said guide and movable to depress the stem of the tire valve, and a spring bearing between the auxiliary valve and the guide and holding such valve closed, the guide being adjustable within the auxiliary casing for regulating the tension of said spring.

In testimony whereof I affix my signature.

THOMAS JEFFERSON STEPHENS [L. S.]